(12) United States Patent
Jain et al.

(10) Patent No.: US 11,733,894 B2
(45) Date of Patent: Aug. 22, 2023

(54) DYNAMICALLY FORMATTED STORAGE ALLOCATION RECORD

(71) Applicant: NUTANIX, INC., San Jose, CA (US)

(72) Inventors: Rohit Jain, Cupertino, CA (US); Harshit Agarwal, Newark, CA (US)

(73) Assignee: NUTANIX, INC., San Jose, CA (US)

(*) Notice: Subject to any disclaimer, the term of this patent is extended or adjusted under 35 U.S.C. 154(b) by 36 days.

(21) Appl. No.: 17/514,221

(22) Filed: Oct. 29, 2021

(65) Prior Publication Data

US 2022/0391094 A1 Dec. 8, 2022

Related U.S. Application Data

(60) Provisional application No. 63/196,583, filed on Jun. 3, 2021.

(51) Int. Cl.
*G06F 12/00* (2006.01)
*G06F 3/06* (2006.01)

(52) U.S. Cl.
CPC .......... *G06F 3/064* (2013.01); *G06F 3/0604* (2013.01); *G06F 3/0631* (2013.01); *G06F 3/0673* (2013.01)

(58) Field of Classification Search
CPC ...... G06F 3/064; G06F 3/0604; G06F 3/0631; G06F 3/0673
See application file for complete search history.

(56) References Cited

U.S. PATENT DOCUMENTS

| | | | | |
|---|---|---|---|---|
| 7,603,529 | B1 * | 10/2009 | MacHardy | G06F 3/0689 711/170 |
| 8,285,757 | B2 * | 10/2012 | Xi | G06F 16/10 707/821 |
| 8,312,242 | B2 | 11/2012 | Casper et al. | |
| 8,549,518 | B1 | 10/2013 | Aron et al. | |
| 8,601,473 | B1 | 12/2013 | Aron et al. | |
| 8,756,396 | B1 | 6/2014 | Pruthi et al. | |

(Continued)

FOREIGN PATENT DOCUMENTS

WO 2011078966 A1 6/2011

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — John A Lane
(74) *Attorney, Agent, or Firm* — Artegis Law Group, LLP

(57) ABSTRACT

One or more non-transitory computer-readable media can store program instructions that, when executed by one or more processors, cause the one or more processors to perform steps of organizing storage as a set of storage regions, each storage region having a fixed size; and for each storage region, storing a storage allocation structure of the storage region formatted in a first format selected from a format set including at least two formats, determining a change of an allocation feature of the storage region, based on the allocation feature of the storage region, selecting, from the format set, a second format of the storage allocation structure, and reformatting the storage allocation structure in the second format.

24 Claims, 11 Drawing Sheets

(56) References Cited

U.S. PATENT DOCUMENTS

| | | | |
|---|---|---|---|
| 8,825,963 B1* | 9/2014 | Edwards | G06F 3/067 |
| | | | 711/147 |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,086,820 B2 | 7/2015 | Gold et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 2011/0131387 A1 | 6/2011 | Bacik | |
| 2012/0284478 A1 | 11/2012 | Brooker et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

"Free space management in Operating System", https://www.geeksforgeeks.org/free-space-management-in-operating-system/, 2 pages.

Burns et al., "A Bit-Parallel Search Algorithm for Allocating Free Space", https://citeseerx.ist.psu.edu/viewdoc/download?doi=10.1.1.117.9176&rep=rep1&type=pdf, 9 pages.

"Bit Map for Dynamic Partitioning", https://www.javatpoint.com/os-bit-map-for-dynamic-partitioning, 2 pages.

* cited by examiner

DYNAMICALLY FORMATTED STORAGE ALLOCATION RECORD

CROSS-REFERENCE TO RELATED APPLICATIONS

This application claims the priority benefit of United States provisional application titled, "DYNAMICALLY FORMATTED STORAGE ALLOCATION RECORD," filed on Jun. 3, 2021, and having Ser. No. 63/196,583. The subject matter of this related application is hereby incorporated herein by reference.

BACKGROUND

Field of the Various Embodiments

Embodiments of the present invention relate generally to computer storage systems, and, more specifically, to techniques for organizing free and allocated blocks of storage within a region of the computer storage.

Description of the Related Art

Techniques for organizing computer storage, such as memory or other storage media (e.g., a disk drive; a solid-state drive (SSD); a flash memory device; a memory circuit that stores instructions and/or data of a computing device; and/or the like), involve a storage allocation record that indicates allocated and free storage of a storage region. The storage system can identify each block of storage (e.g., words, such as 64-bit integers) by an ID or address, and can use a data structure based on ID allocation for performing free-space management in a persistent manner (e.g., on disk). The ID allocation can involve an application programming interface (API) including Allocate (number of IDs) and Deallocate (ID list) functions for allocating and deallocating IDs. To implement this, the storage system can maintain a set of allocator pages, which can be stored on the same storage device (e.g., on disk) or elsewhere. The size of an allocator page can be chosen as the unit of atomic IO on disk—typically 4 KB for SSDs.

The storage allocation record can be formatted in different ways, each of which can have advantages and disadvantages. For example, the storage allocation record can be formatted as a list or array of extents, each extent specifying an allocated storage region based on a first value in an extent representing the first ID in the list of IDs and a second value indicating a number of IDs in the extent.

Advantages of the extent list format include that a single extent can represent an arbitrarily large list of contiguous IDs, and can be a very compact representation of the free space in a storage region or a result of an allocation request. A compact representation can be very efficient to allocate a large number of contiguous IDs from an extent-based data structure. Also, a compact representation can be stored very compactly in storage, such as on disk.

However, the compactness is contingent upon the storage region and the list of IDs to be represented by the extent list as not being highly fragmented, and the extent-based data structure performs poorly when the list of IDs is fragmented because each extent can only express a small number of IDs. An allocation result can require more space to store the storage allocation record as an extent list when fragmentation is high than when fragmentation is low. As a result, the extent list can be inefficiently large, and in some cases, can become large enough to not fit within a single allocator page. When the extent list is large, allocating from a fragmenting extent list of IDs can require the storage system to walk through a lengthy list of extents. As a result, the storage allocation record formatted as an extent list can perform slowly during allocate, deallocate, or insert requests. Also, deallocations can require searching through the list of extents to determine if an existing extent needs to be modified or a new extent needs to be created. Efficiency can be relatively improved by keeping the list of extents sorted, but it can still be inefficient to insert in the middle of the sorted array of extents, which requires shifting the rest of the extents in the array.

Alternatively, the storage allocation record can be formatted as a bitmap, where each bit of the bitmap corresponds to an ID and indicates whether the storage identified by the ID is free or allocated. In a bitmap format of a storage allocation record, every ID is represented by a single bit, where a set bit represents an allocated ID and a clear bit represents a free ID (or this can be reversed by an alternate implementation). A single allocator page can contain $2^{12}$ bytes ($2^{15}$ bits), and a storage allocation record that is formatted as a bitmap can store allocation information on $2^{15}=32,768$ IDs. An allocation request can be served by iterating through the bitmap linearly collecting bits that represent free IDs and marking them as allocated until the allocation request is satisfied.

Advantages of a bitmap format of a storage allocation record include that the space usage of the bitmap is independent of the fragmentation of the storage space tracked in the allocator page. Consequently, when fragmentation of the storage represented by the storage allocation record is high, the bitmap can become a more compact representation than an extent-based organization where each fragment of free-id space requires its own extent. When the number of IDs to be managed by the storage allocation record is selected as the number of bits in the storage region, the bitmap can represent the entire free-ID space of the storage region regardless of the degree of storage fragmentation. Also, deallocating an ID is a constant time operation in a bitmap whereas it can be a linear or binary search in case of an extent-based data structure. However, disadvantages of a bitmap format of a storage allocation record include that, because each bit indicates whether each block (e.g., each word) is free or allocated, the bitmap format can be inefficiently large and can perform slowly during large allocate or deallocate requests where storage fragmentation of the storage region is low.

As the foregoing illustrates, what is needed are more effective techniques for storing and organizing storage allocation of a computer storage that maintains high performance in a variety of conditions, such as the degree of storage fragmentation.

SUMMARY

In some embodiments, one or more non-transitory computer-readable media store program instructions that, when executed by one or more processors, cause the one or more processors to perform steps of organizing storage as a set of storage regions, each storage region having a fixed size; and for each storage region, storing a storage allocation structure of the storage region formatted in a first format selected from a format set including at least two formats, determining a change of an allocation feature of the storage region, based on the allocation feature of the storage region, selecting, from the format set, a second format of the storage allocation structure, and reformatting the storage allocation structure in the second format.

Other embodiments include, without limitation, a method and a system the implement one or more aspects of the disclosed techniques.

At least one technical advantage of the disclosed techniques relative to the prior art is that, with the disclosed techniques, a storage system can compactly record storage allocation information even when there is a high level of variability in how the storage regions of a storage device are allocated. As a result, the dynamic format of the storage allocation record provides the advantages of multiple formats while avoiding the disadvantages of those formats. By reformatting the storage allocation record to suit different circumstances, the storage system can exhibit and maintain high performance in creating, accessing, and updating storage allocations in a wide range of circumstances, such as when storage fragmentation is high or low, in accordance with some embodiments. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts can be practiced without one or more of these specific details.

Exemplary Computer System

Figure 1:
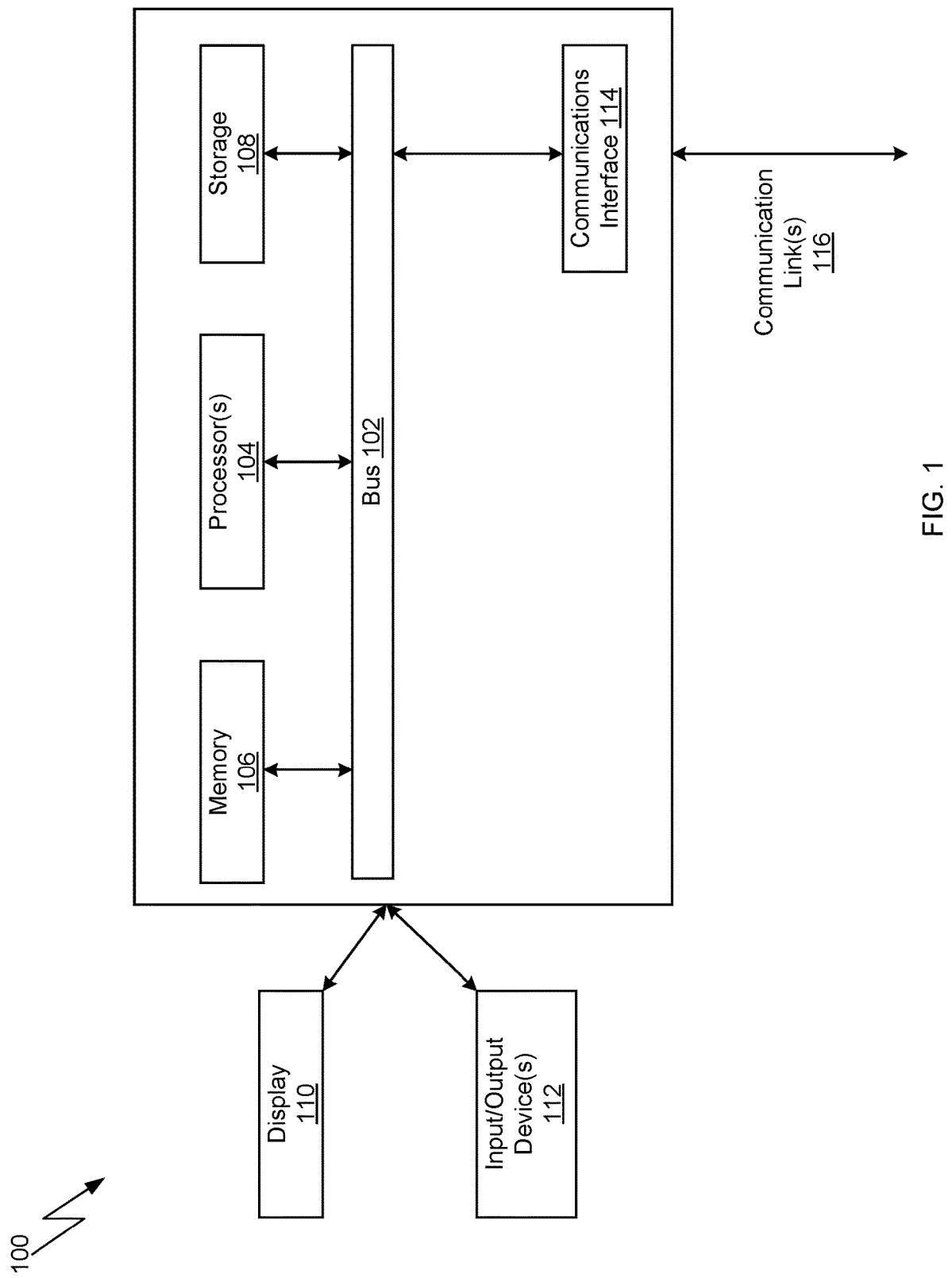
FIG. 1 is a block diagram illustrating a computer system configured to implement one or more aspects of the present embodiments.

FIG. 1 is a block diagram illustrating a computer system 100 configured to implement one or more aspects of the present embodiments. In some embodiments, computer system 100 is a server machine operating in a data center or a cloud computing environment suitable for implementing an embodiment of the present invention. As shown, computer system 100 includes a bus 102 or other communication mechanism for communicating information, which interconnects subsystems and devices, such as one or more processors 104, memory 106, storage 108, optional display 110, one or more input/output devices 112, and a communications interface 114. Computer system 100 described herein is illustrative and any other technically feasible configurations fall within the scope of the present disclosure.

The one or more processors 104 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 104 can be any technically feasible hardware unit capable of processing data and/or executing software applications. Further, in the context of this disclosure, the computing elements shown in computer system 100 can correspond to a physical computing system (e.g., a system in a data center) or can be a virtual computing instance.

Memory 106 includes a random-access memory (RAM) module, a flash memory unit, and/or any other type of memory unit or combination thereof. The one or more processors 104, and/or communications interface 114 are configured to read data from and write data to memory 106. Memory 106 includes various software programs that include one or more instructions that can be executed by the one or more processors 104 and application data associated with said software programs.

Storage 108 includes non-volatile storage for applications and data. Storage 108 is a linearly addressable storage entity. In some embodiments, storage 108 can be (without limitation) a physical storage device such as a hard disk drive (HDD), a solid-state drive (SSD), a non-volatile memory express (NVMe) device, Optane memory, a virtual storage device such as a vDisk or a non-persistent linearly addressable device such as DRAM, flash memory devices, and/or other magnetic, optical, and/or solid-state storage devices.

Communications interface 114 includes hardware and/or software for coupling computer system 100 to one or more communication links 115. The one or more communication links 115 can include any technically feasible type of communications network that allows data to be exchanged between computer system 100 and external entities or devices, such as a web server or another networked computing system. For example, the one or more communication links 115 can include one or more wide area networks (WANs), one or more local area networks (LANs), one or more wireless (WiFi) networks, the Internet, and/or the like.

Figure 2:
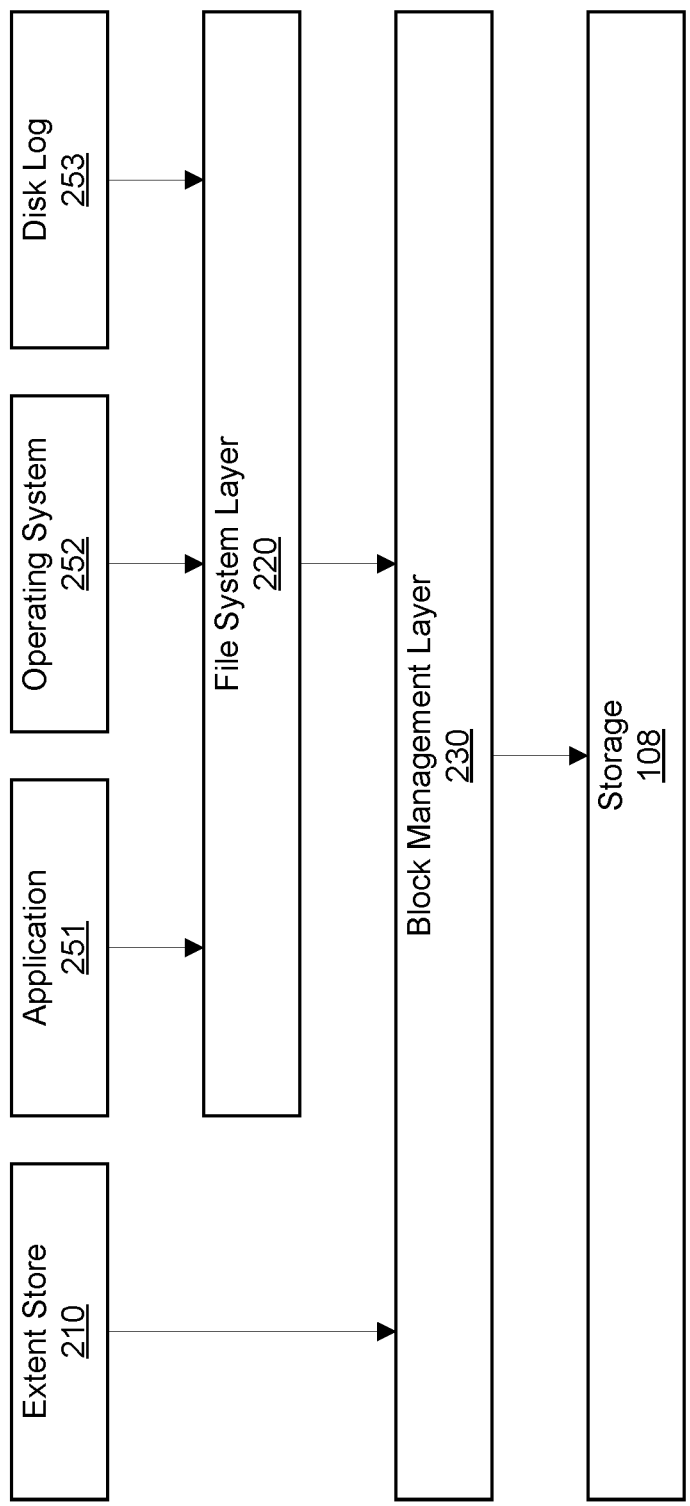
FIG. 2 is a block diagram illustrating a block store of the storage of FIG. 1, according to various embodiments.

FIG. 2 is a block diagram illustrating a block store 200 of the storage 108 of FIG. 1, according to various embodiments of the present disclosure. Block store 200 includes, without limitation, an extent store 210, one or more applications 251, an operating system 252, a disk log 253, a file system layer 220, a block management layer 230, and storage 108. As shown in FIG. 2, block store 200 is built around storage 108. Block store 200 provides several services for accessing the storage 108.

A block management layer 230 is responsible for allocation and deallocation of blocks of storage 108. Block management layer 230 provides a block allocation application programming interface (API) that can be used by other parts of block store 200. In some embodiments, the minimum block size that block store 200 supports is provided as an argument to a block store format operation. Allocations and deallocations of blocks in block store 200 are performed using an entity called a component. In some embodiments, an application, such as any of application 251, operating system 252, disk log 253, and/or the like, can register multiple components in a single block store instance. When registering a component, the application can provide a block size that is a multiple of the minimum block size of storage 108. In this manner, every component can have a unique block size.

In some embodiments, block store 200 performs no hard partitioning of space among components, and each component can dynamically allocate and deallocate blocks of storage 108. Storage regions are described in further detail below with respect to FIG. 3.

The extent store 210 is a storage system in which each request to allocate storage of a designated size is fulfilled by reserving a contiguous area of storage. Each allocation is recorded as a range, such as an ID indicating a starting point of the area and a size or length of the area. Extent stores 210 can efficiently record allocations of large sizes using only two values, and because if requested allocations are persistent, storage can be allocated as a compact set of allocated areas.

The file system layer 220 couples block management layer 230 to applications 251-253. In some embodiments, file system layer 220 is compatible with the fourth extended file system (ext4) employed by certain systems that execute the Linux operating system. File system layer 220 provides a file system API usable by applications 251-253. In some embodiments, file system layer 220 provides a POSIX-like file system API to applications 251-253. File system layer 220 is employed by those portions of applications 251-253 that do not manage metadata for block store 200 at a block level, but rather at a file level. For example, the file-system backend used by disk log 253 employs the file system API to generate difference files, also referred to herein as "delta files," and checkpoint files. As other examples, additional applications (not shown) use the file system API to manage episode files, database files, and/or the like.

In some embodiments, file system layer 220 employs B+Trees to store the blocks backing the files. For example, a file descriptor for a file is the inode identifier (ID) which, in turn, is a pointer to the root block of the B+Tree containing the blocks backing the file. The key in the file descriptor is the logical block address (LBA) and the value is an extent-like structure which provides the starting block ID and the number of blocks backing the space starting at a given LBA. Minimal metadata about the file (such as the size and the m-time) is stored as a special key-value pair in the B+Tree.

In some embodiments, file system layer 220 implements directories using B+Trees to store mappings from file names to the corresponding inode IDs and inode types. The inode ID for a file points to the root node of the B+Tree for that file, and the inode ID for a directory points to the root node of the B+Tree for that directory.

Free Space Management in a Block Store

Figure 3:
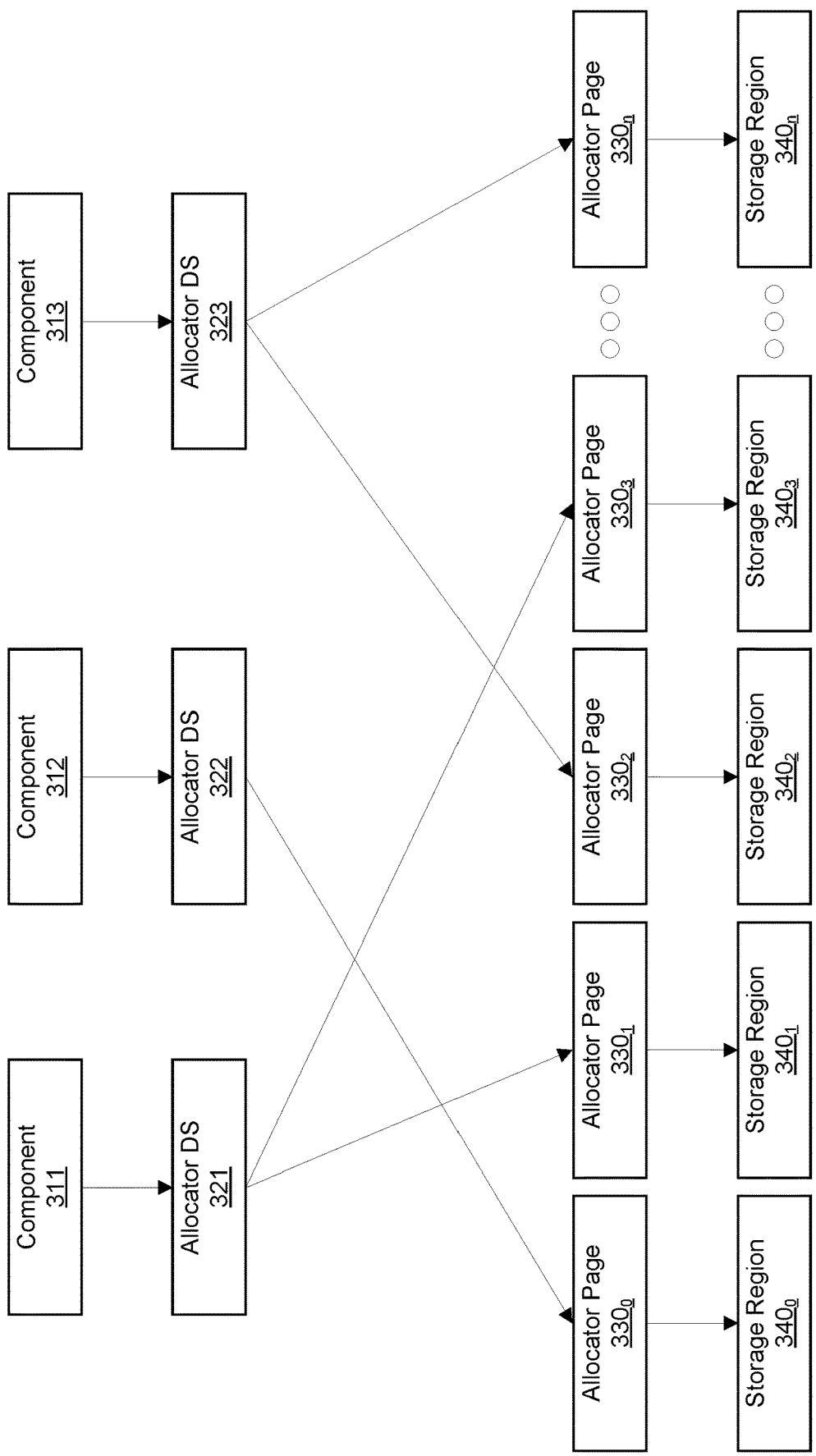
FIG. 3 is a block diagram illustrating storage allocation for a block store, according to various embodiments.

FIG. 3 is a block diagram illustrating storage allocation for the block store 200 of FIG. 2, according to various embodiments of the present disclosure. As shown in FIG. 3, each of a plurality of components 311-313 maintains a respective allocator data structure (DS) 321-323 that manages one or more allocator pages (alloc pages) $330_0$-$330_n$, which each provide information on a respective storage region $340_0$-$340_n$ as is described in further detail below.

Block store 200 employs a data structure, referred to herein as an "allocator," for performing free-space management within block store 200 in a persistent manner (e.g., in storage 108). Each allocator provides an Allocate(num_ids) and Deallocate(id_list) API for allocating and deallocating blocks identified by IDs. In some examples, an ID can be a 64-bit integer. The range of the IDs is determined by the set of allocator pages maintained by the allocator.

To perform free space management in block store 200, each allocator maintains a set of allocator pages. Each allocator page tracks allocations for a region. Each allocator page is associated with a number that places the allocator page within the global ID allocation space. Therefore, allocator page number 0 represents IDs 0-32,767, allocator page number 1 represents IDs 32,768-65,535, and so on. An allocator instance can maintain a set of allocator pages that are not contiguous. The union of the IDs represented by those allocator pages defines the range of IDs that can be allocated using the allocator.

Block store 200 uses the allocators to perform fixed sized block allocations from storage 108. For example, block store 200 can be formatted with a block size of 8 kB, which means that block store 200 allocates 8 kB of storage when allocating a single block. When using an allocator for free space management in block store 200, each ID represents a single block. Therefore, every ID represents 8 kB of storage in this example. As a result, a single 4 kB allocator page represents $2^{15}$=32,768 blocks, which is equal to $2^{15}*8$ kB=$2^{28}$ bytes=256 MB of storage.

Given the size of storage that is managed by a single allocator page 330, storage 108 is divided into storage regions 340, where each storage region 340 is a fixed-size chunk of space (256 MB in our example) that can be managed by a single allocator page 330. As an example, when storage 108 is 1 PB ($2^{50}$ bytes) in size, storage 108 has $2^{50}/2^{28}=2^{22}$=4 million storage regions 340. Because each storage region 340 uses a single allocator page 330, 1 PB of storage 108 has 4 million allocator pages 330 to manage the free space at an 8 kB block size granularity.

In some embodiments, the block store 200 exposes the concept of a component 311-313 to an application, such as one of the applications 251-253. For example (without limitation), each component 311-313 can maintain a corresponding set of storage regions 340 within storage 108 from where the component 311-313 allocates blocks. In such embodiments, this technique prevents the allocation behavior of one component 311-313 from impacting any other components 311-313. For example, if one component 311-313 has an allocation pattern that causes a lot of fragmentation in the allocation space, the fragmentation is limited to the storage regions 340 owned by that component 311-313 and does not impact other components 311-313.

To facilitate the use of components 311-313, block store 200 maintains a respective block allocator data structure 321-323 for each component 311-313. The root level of each allocator data structure 321-323 is used for allocating storage regions 340. Each component 311-313 dynamically allocates storage regions 340 on demand. When a new component 311-313 is generated, the new component 311-313 starts out with just one storage region 340 allocated dynamically by a storage region allocator, and when all blocks are allocated from the current set of allocated storage regions 340, a new storage region 340 is dynamically allocated. When all blocks in a storage region 340 are deallocated, the storage region 340 is returned back to the storage region allocator for later allocation.

Each component 311-313 maintains a block allocator for allocating blocks from the set of storage regions that have been allocated by the respective component 311-313. Both the storage region allocator and the per-component block allocators are instances of the allocator described above. In case of the storage region allocator, each bit in an allocator page represents a storage region 340. For 4 million (2^22) storage regions 340, 2^22/2^15=128 allocator pages are used. These 128 allocator pages are allocated statically during the block store format operation and added to the storage region allocator in one pass.

Storage Allocation Structures

Figure 4A:
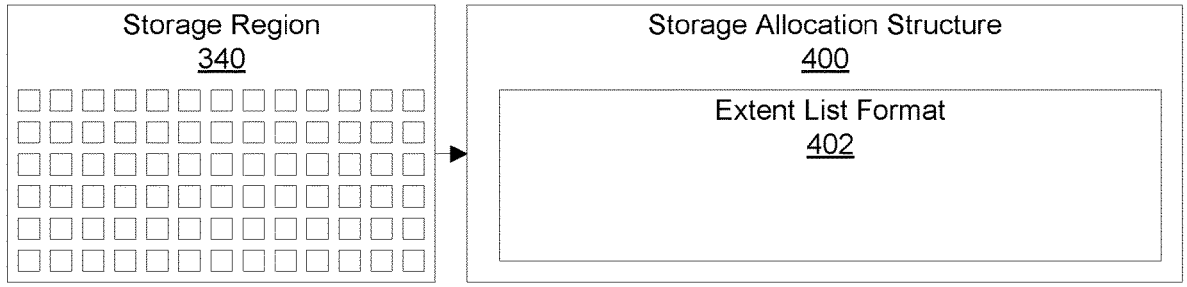
FIGS. 4A-4C are storage allocation formats for a storage region according to various embodiments.
Figure 4B:
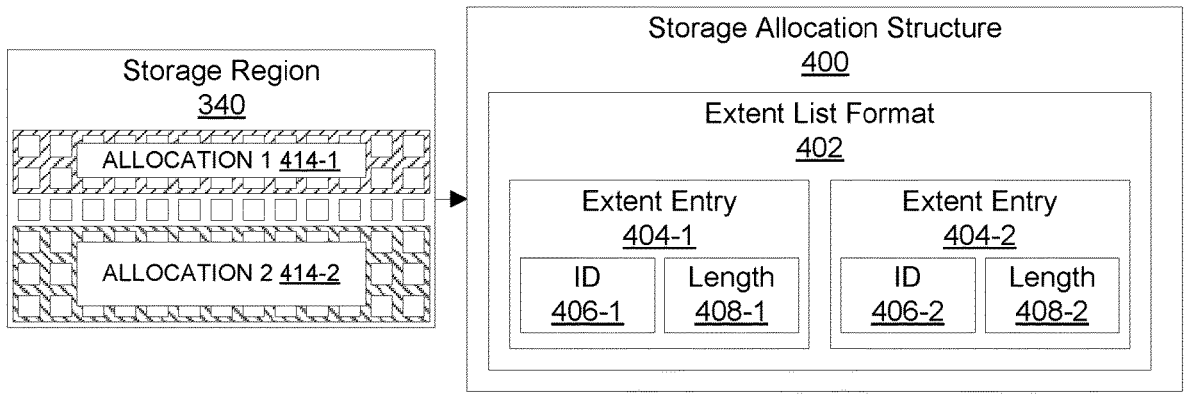
Figure 4C:
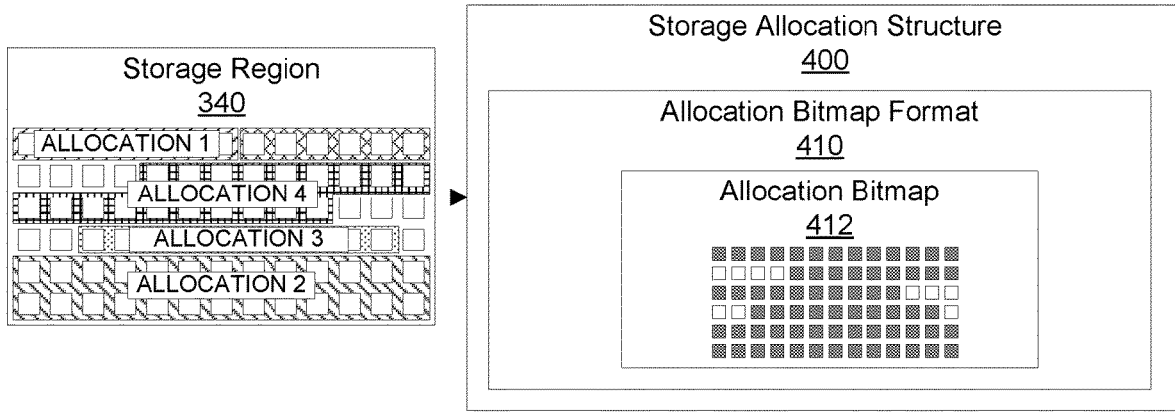

FIGS. 4A-4C are storage allocation formats for a storage region according to various embodiments. The storage allocation formats shown in FIGS. 4A-4C can be generated, for example, for storage regions of at least part of the storage 108 of FIGS. 1 and 2.

FIG. 4A shows a storage allocation format that is initially generated for a storage region 340, according to some embodiments. In some embodiments, the storage region 340 is generated or allocated when storage 108 is added to computer system 100, or when the storage 108 is initialized, partitioned, and/or formatted by the computer system 100. In some embodiments, the storage region 340 is generated or allocated in response to a request to allocate capacity of the storage 108 (e.g., when currently allocated storage regions 340 are insufficient to satisfy the request and the storage 108 has unallocated capacity). In some embodiments, storage is organized as a set of storage regions, each storage region having a fixed size. In some examples, during initializing, partitioning, and/or formatting of newly provided storage 108, a fixed size of each storage region can be selected. In some examples, the fixed size can be selected based on a hardware device providing the storage 108 or capabilities thereof; a partitioning format of the storage 108; a file system to be represented within the storage 108; one or more operating systems and/or applications that will access the storage 108; a selection by a user; or the like.

In various embodiments, when the storage region 340 is generated or allocated, a storage allocation structure 400 is generated or allocated in a first format selected from a format set including at least two formats. As shown, the storage allocation structure 400 is initially allocated in an extent list format 402, in which each storage allocation is recorded as an extent. As shown, when no storage allocations within the storage region 340 have occurred, the storage allocation structure 400 is empty, indicating that the storage region 340 is currently unallocated. In some embodiments (not shown), the storage allocation structure 400 can be initially allocated in a different storage allocation format, such as an allocation bitmap format 410 or any other format that is suitable for recording allocations within the storage region 340. In some embodiments (not shown), the storage allocation structure 400 is not initially empty, but is created with at least one recorded allocation, such as at least one extent.

FIG. 4B shows an extent list format of a storage allocation structure for a partially allocated storage region, according to some embodiments. In some embodiments, for a first allocation 414-1 within the storage region 340, a first extent entry 404-1 is created within the storage allocation structure 400. Similarly, for a second allocation 414-2 within the storage region 340, a second extent entry 404-2 is created within the storage allocation structure 400. In various embodiments, the storage allocation structure 400 is recorded within the storage region 340 (e.g. and without limitation, at the start of the storage region 340), or in another portion of storage 108, such as a metadata region of the storage 108.

In an extent list format 402 of a storage allocation structure 400, each extent entry 404 can indicate an allocation within the storage region 340 in a variety of ways. As shown, the first extent entry 404-1 indicates an ID, such as an ID 406-1, within the storage region 340 at which the allocation begins and a length 408-1 of allocated space within the storage region 340 following an address indicated by the ID 406-1. In some embodiments, each ID 406 indicates an offset from a first address within the storage region 340. In some other embodiments each ID 406 is indicated within an address range of storage 108 that is mapped to the storage region 340. In some embodiments, each length 408 is indicated as a multiple of a unit of allocation, such as a block size of a block store 200. In some other embodiments (not shown), each extent entry 404 is specified as a start address and an end address. In some other embodiments (not shown), each extent entry 404 is specified as a length 408 of allocated storage following a sequentially preceding extent entry 404.

In FIGS. 4A and 4B, the extent list format 402 includes extent entries 404 that represent allocations, such that the extent list for an initially unallocated storage region 340 is empty, and extent entries 404 are generated to represent each allocation. However, in some embodiments, extent entries 404 can represent unallocated storage capacity. In these embodiments, the extent list for an initially unallocated storage region 340 includes one extent entry 404 for the capacity of the entire storage region. For each storage allocation, the extent list is updated to generate extent entries 404 that respectively represent a portion of the unallocated storage region 340. An extent list format 402 in which extent entries 404 record unallocated storage capacity can be efficient for allocating new storage, for example, by identifying an extent entry 404 of at least the size indicated in an allocation request. The techniques discussed herein can be similarly applied to various embodiments including these and other variations of the extent list format 402.

In an extent list format 402 of a storage allocation structure 400, as allocations accumulate and/or change within the storage region 340, the number of extent entries 404 increases. Further, additional allocations and changes to such allocations can result in fragmentation of the storage region 340. For example, a deletion of an allocation of a small size can result in unallocated storage capacity between two other allocations. As another example, a change of an allocation, such as a request to reduce the size of the allocation, can result in an unallocated portion of storage between the reduced-size extent and another extent. Due to storage fragmentation, a request to allocate storage of a particular size can result in the allocation of two or more extents within the storage allocation structure 400, where the two or more extents together provide the size of the requested storage allocation.

In an extent list format 402 of the storage allocation structure 400, the total size of the storage allocation structure 400 is based on the number of extent entries 404. When the storage allocation structure is empty (such as shown in FIG. 4A), the size of the storage allocation structure 400 can be zero, or can be limited to metadata, such as an extent list count of extents within the storage region 340 (currently zero). When the storage allocation structure 400 includes a small number of extent entries 404, the storage allocation structure 400 can be quickly evaluated to determine allocated and unallocated portions of the storage region 340, and can be quickly updated in response to allocation changes. However, when the storage allocation structure includes numerous extent entries 404, the size of the storage allocation structure 400 can be large. An increasing number of extent entries 404 can reduce the efficiency of storing and accessing the storage allocation structure 400. For example, when the number of extent entries 404 is large, an additional allocation request that requires identifying an unallocated portion of the storage region 340 can require examining a large number of extent entries 404. As another example, when the number of extent entries 404 is large, determining whether a specific portion of the storage region 340 is allocated or unallocated, such as during compaction operations, can require examining a large number of extent entries 404. As yet another example, when the number of extent entries 404 is large, the extent list can no longer fit in the storage space initially allocated for the extent list.

In various embodiments, based on a change of an allocation feature of the storage region 340, the storage allocation structure 400 is reformatted in a second format that is selected from a format set of at least two formats. In some embodiments, based on an increase of a fragmentation level of storage allocations of the storage region 340 while the storage allocation structure 400 is in an extent list format 402, the extent storage allocation structure 400 is reformatted in an allocation bitmap format 410. In some embodiments, the allocation feature includes a fragmentation level of storage allocations of the storage region 340. For example, due to increasing storage fragmentation of the storage region 340 and/or an increasing number of extent entries 404 stored by a storage allocation structure 400 in an extent list format 402, the storage allocation structure 400 can be reformatted in a different format that provides greater storage and access efficiency, such as an allocation bitmap format.

FIG. 4C shows an allocation bitmap format 410 of a storage allocation structure for a partially allocated storage region, according to some embodiments. As shown, in the allocation bitmap format 410, the storage allocation structure 400 stores an allocation bitmap 412 that indicates whether respective portions of the storage region 340 are allocated or unallocated. In some embodiments, the allocation bitmap 412 is stored as a series of Boolean values. In some embodiments, respective units of the allocation bitmap 412 correspond to respective data sizes of the storage region 340, such as a block size of a block store 200. In some embodiments, respective units of the allocation bitmap 412 correspond to respective addresses within the storage region 340.

In an allocation bitmap format 410 of the storage allocation structure 400, the total size of the storage allocation structure 400 is a fixed size that is irrespective of the allocation of the storage region 340. That is, the allocation bitmap 412 has the same size when the storage region 340 is completely unallocated, partially allocated, or completely allocated. In some embodiments, an allocation request of a particular size is fulfilled by examining the allocation bitmap 412 to identify a number of unallocated units of the storage region 340 that together provide capacity of at least the requested size. The units can be contiguous (e.g., six consecutive units of unallocated storage capacity) or non-contiguous (e.g., two three-unit portions of unallocated storage capacity). For each unit of storage that is identified for the allocation request, the allocation bitmap 412 is updated to indicate that the unit is allocated. Similarly, in response to a deallocation request, the allocation bitmap 412 is updated to indicate that each unit associated with the allocation is now unallocated and available to fulfill other allocation requests.

When fragmentation of the storage region 340 is low (e.g., when the storage region 340 is completely or mostly unallocated, or completely or mostly allocated), the allocation bitmap 412 can be larger, and thus less efficient to store and access, than a corresponding extent list that includes a small number of extent entries 404. Alternatively, when fragmentation of the storage region 340 is high (e.g., when numerous individual portions of the storage region 340 are allocated), the allocation bitmap 412 can be smaller, and thus more efficient to store and access, than a corresponding extent list that includes a small number of extent entries 404.

In various embodiments, based on a change of an allocation feature of the storage region 340, the storage allocation structure 400 can again be reformatted in a first format that is selected from a format set of at least two formats. In some embodiments, based on a decrease of a fragmentation level of storage allocations of the storage region 340 while the storage allocation structure is in an allocation bitmap format 410, the storage allocation structure 400 can be reformatted in an extent list format 402. In some embodiments, the allocation feature includes a fragmentation level of storage allocations of the storage region 340. For example, due to decreasing storage fragmentation of the storage region 340 and/or a decreasing number of extent entries 404 stored by a storage allocation structure 400 in an allocation bitmap format 410, the storage allocation structure 400 can be reformatted in a different format that provides greater storage and access efficiency, such as the extent list format 402. In various embodiments, the reformatting can occur as part of the change of the allocation feature (e.g., as part of an allocation request) or after such a change of the allocation feature (e.g., as part of a maintenance function performed on the storage region 340).

In some other embodiments (not shown), the allocation feature of the storage region 340 can include a fragmentation level of the storage region 340. In some examples, upon determining that fragmentation of the storage region 340 is low (e.g., a small number of consecutive sequences of allocated units of the storage region 340), the storage allocation structure 400 can be reformatted in a format that is efficient for low-fragmentation storage regions 340, such as an extent list format 402. In some examples, upon determining that fragmentation of the storage region 340 is high (e.g., a large number of consecutive sequences of allocated units of the storage region 340), the storage allocation structure 400 can be reformatted in a format that is efficient for high-fragmentation storage regions 340, such as an allocation bitmap format 410.

Figure 5A:
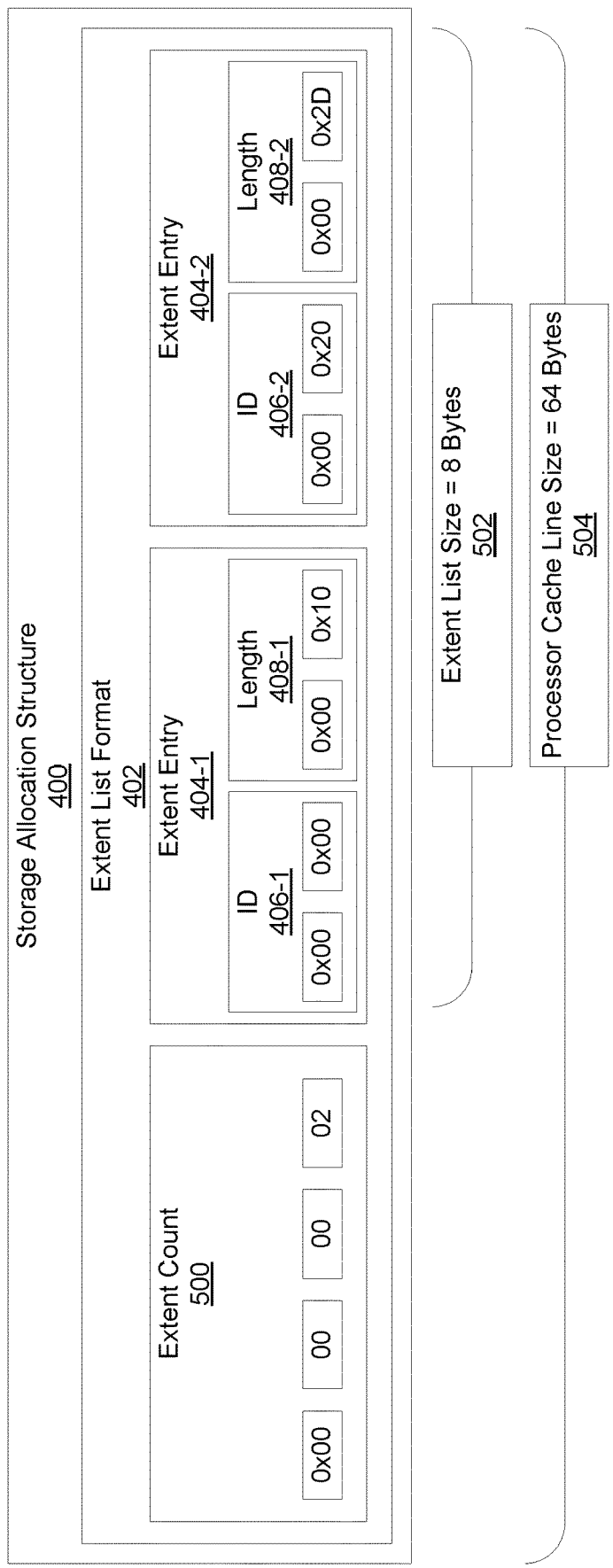
FIGS. 5A-5B are storage allocation structures for a storage region, according to various embodiments.
Figure 5B:
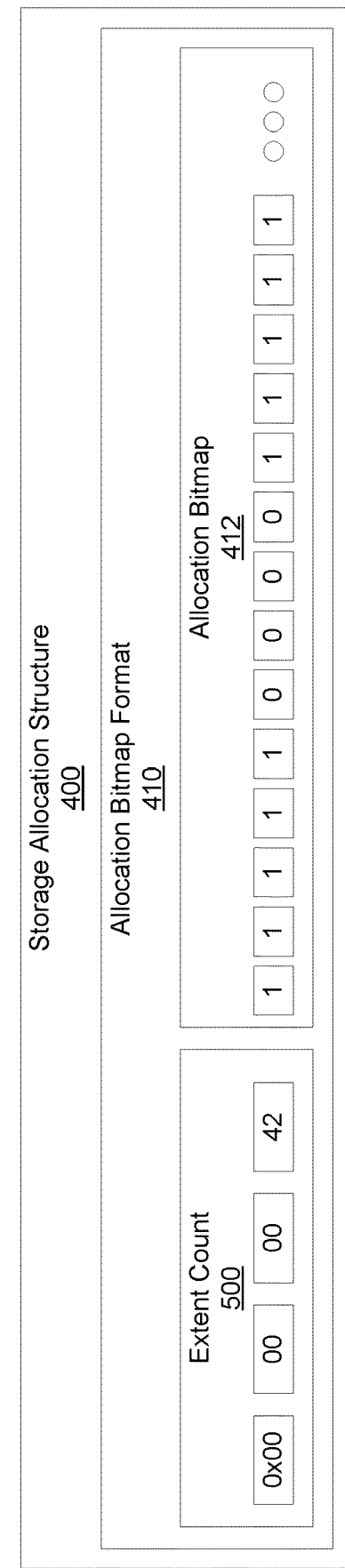

FIGS. 5A-5B are storage allocation structures 400 for a storage region 340, according to various embodiments. The storage allocation structures shown in FIGS. 5A-5B can be generated, for example, for the storage allocation structures 400 shown in FIGS. 4A-4C.

FIG. 5A shows a storage allocation structure 400 in an extent list format 402, according to various embodiments. As shown, the storage allocation structure 400 in the extent list format 402 includes, without limitation, an extent count 500 and a list of extent entries 404, such as a first extent entry 404-1 and a second extent entry 404-2. In some embodiments, a 4-byte header is stored at the beginning of the allocator page, wherein the header includes the extent count 500 of extent entries, and the extent count 500 is used to determine whether the storage allocation structure 400 is currently formatted in an extent list format 402 or an allocation bitmap format 410. Further, as shown, each extent entry 404-1, 404-2 indicates a two-byte ID 406-1, 406-2 within the storage region 340 at which the extent entry 404-1, 404-2 begins and a two-byte length 408-1, 408-2 of the extent entry 404-1, 404-2 following the ID 406-1, 406-2. The extent count 500 indicates a count of the extent entries 404 within the extent list, and can be represented by any number of bytes, such as four bytes (as shown). In the extent list format 402, the storage allocation structure 400 has an extent list size 502. As shown, an extent list including two four-byte extent entries 404-1, 404-2 has an extent list size 502 of 8 bytes. In some embodiments, the extent count 500 is incremented in response to the addition of a new extent entry 404 to storage allocation structure 400 and decremented in response to the removal of an extent entry 404 from storage allocation structure. In some other embodiments, the extent count 500 is determined by counting the number of extent entries 404 in the extent list.

FIG. 5B shows a storage allocation structure 400 in an allocation bitmap format 410, according to various embodiments. As shown, the storage allocation structure 400 in the allocation bitmap format 410 includes, without limitation, extent count 500, and an allocation bitmap 412, such as a sequence of bits respectively correspond to a unit of the storage region 340, such as a block size of a block store 200. As shown, the storage allocation structure 400 in the allocation bitmap format 410 also includes an extent count 500 of the number of extent entries 404 that would be required to represent the allocation of the storage region 340 in an extent list format 402, such as 66 (0x42) extent entries. In some embodiments, the extent count 500 is determined by evaluating the allocation bitmap 412, e.g., by counting the number of consecutive sequences of allocated units of the storage region 340 or tracking the number of extents as allocations and deallocations are performed on the storage region 340.

In various embodiments, the format of the storage allocation structure 400 is selected based on various allocation features of the storage region 340. In some embodiments, the allocation feature includes the extent count 500. In some embodiments, the extent count 500 of the storage allocation structure 400 is compared with an extent count threshold to determine whether to format the storage allocation structure 400 in an extent list format 402 or an allocation bitmap format 410. In some embodiments, an extent count threshold is selected as the largest number of extent entries that can be described in a header including a four-byte extent count and an extent list, and can be stored within one cache line of a memory cache of the device. As an example, an extent entry could be represented in 4 bytes (that is, as a pair of 2-byte values), and a cache line could contain (64-4)/4=15 extent entries. In some embodiments, a 4-byte header is stored at the beginning of the allocator page, wherein the header includes the extent count 500 of extent entries 404, and the extent count 500 is used to determine whether the storage allocation structure 400 is currently formatted in an extent list format 402 or an allocation bitmap format 410.

In some embodiments, each storage region 340 can store the storage allocation structure 400 as a four-byte header at the start of the storage region 340. The header can include an extent count 500 of extent entries 404 if the storage allocation structure 400 were formatted in an extent list format 402. When the extent count 500 is less than an extent count threshold (e.g., during initialization when all storage is free), the storage allocation structure 400 can be formatted in the extent list format 402. When the extent count 500 meets or exceeds the extent count threshold (e.g., due to storage fragmentation), a processor of the computer system 100 can convert the storage allocation structure 400 to an allocation bitmap format 410. When reduced storage fragmentation causes the extent count 500 to fall below the extent count threshold, the processor can convert the storage allocation structure 400 back to the extent list format 402.

In various embodiments, an amount of storage for the storage allocation structure 400 if formatted in the extent list format 402 can be compared with a cache line size 504 of a cache of a processor, such as one or more of the one or more processors 104 of the computer system 100 of FIG. 1. The extent list format 402 can be used if the extent count 500 and the extent list would fit in a single cache line of a microprocessor, such as a 64-byte cache line of an Intel processor. In some embodiments, this determination is performed based on an extent count 500 of extent entries 404 (e.g., stored in a header at the beginning of the storage allocation structure 400). Further, an extent count threshold can indicate a maximum number of extent entries 404 that can be stored in a single cache line. When the storage for the extent count 500 and the extent list size 502 is not greater than the cache line size 504 of the cache (e.g., when the extent count 500 of extent entries 404 is less than or equal to the extent count threshold), the storage allocation structure 400 can be written as one word to the cache. When the entire extent list is contained in a single cache line, a search of the extent list, as well as shifting the extents to the right during an insertion operation, can be efficient. That is, multiple accesses to the same cache line can be significantly faster than accesses to different cache lines, which cannot all be cached in the processor caches. Thus, in some embodiments, when the size of the header (e.g., the extent count) grows beyond the size of a cache line, the storage allocation structure can be reformatted in an allocation bitmap format 410. That is, in some embodiments, the storage allocation structure 400 is formatted in an extent list format 402 based on a storage size of an extent count 500 and an extent list of extent entries 404 being within a cache line size 504 of the one or more processors. When the storage for the extent count 500 and the extent list size 502 is greater than the cache line size 504 of the cache (e.g., when the extent count 500 of extent entries 400 is greater than the extent count threshold), the storage allocation structure 400 can require two or more cache lines to store. Thus, in some embodiments, the storage allocation structure 400 is formatted in an allocation bitmap format 410 based on a storage size of an extent count 500 and an extent list of extent entries 404 exceeding a cache line size 504 of the one or more processors.

In various embodiments, evaluation of an allocation feature can occur at various times and/or in response to various events. In some embodiments, an allocation feature is evaluated during or as part of a change of the allocation feature (e.g., as part of an allocation or deallocation request). In some embodiments, an allocation feature is evaluated after a change of the allocation feature (e.g., as part of a periodic maintenance function performed on the storage region 340). In some embodiments, an allocation feature is evaluated based on detecting an inefficiency of storing or accessing the storage allocation structure 400 (e.g., based on accesses or updates of the storage allocation structure 400 taking longer than a threshold duration). As an example), when the storage allocation structure 400 is in the allocation bitmap format 410, the allocation bitmap 412 can be evaluated to determine an extent count 500 of extent entries 404 that would be required to represent the storage allocation structure 400 in the extent list format 402. As another example, when a unit of the storage region 304 is allocated, the allocation bitmap 412 can be examined to determine whether the units on one or both sides of the unit are currently allocated. If the units on both sides are unallocated, the extent count 500 can be increased by one. If the units on both sides are allocated, the extent count 500 can be decreased by one. If the unit on one side is allocated and the unit on the other side is unallocated, the extent count 500 can be maintained. Similarly, when a unit of the storage region 304 is deallocated, the allocation bitmap 412 can be examined to determine whether the units on one or both sides of the unit are currently allocated. If the units on both sides are unallocated, the extent count 500 can be decreased by one. If the units on both sides are allocated, the extent count 500 can be increased by one. If the unit on one side is allocated and the unit on the other side is unallocated, the extent count 500 can be maintained.

In various embodiments, reformatting of the storage allocation structure 400 can occur at various times and/or in response to various events. In some embodiments, reformatting of the storage allocation structure 400 occurs during or as part of a change of the allocation feature (e.g., as part of an allocation or deallocation request). In some embodiments, reformatting of the storage allocation structure 400 occurs after a change of the allocation feature (e.g., as part of a periodic maintenance function performed on the storage region 340). In some embodiments, reformatting of the storage allocation structure 400 can occur at the same time or in the same operation as evaluating the allocation feature. In some embodiments, reformatting of the storage allocation structure 400 can occur at a different time as evaluating the allocation feature. For example, the allocation feature can be periodically evaluated to determine whether the storage allocation structure 400 could be reformatted. Based on the allocation feature determining that the storage allocation structure 400 is to be reformatted, the storage allocation structure 400 can be promptly reformatted if usage of the storage 108 or the storage region 340 is low, or can be postponed or omitted if usage of the storage 108 or the storage region 340 is high.

In various embodiments, reformatting of the storage allocation structure 400 can occur in various ways. As an example, in order to reformat a storage allocation structure 400 from an extent list format 402 to an allocation bitmap format 410, an allocation bitmap 412 is first allocated, where all units are indicated as unallocated (e.g., Boolean 0). For each extent entry of the extent list, the corresponding units of the allocation bitmap 412 are marked as allocated (e.g., Boolean 1). Upon completing the evaluation of the extent list, the allocation bitmap can be written to storage 108, e.g., to a metadata area of storage 108, to replace the extent list. As another example (without limitation), in order to reformat a storage allocation structure 400 from an allocation bitmap format 410 to an extent list format 402, an extent list is first created that is initially empty. The allocation bitmap 412 is examined to determine consecutive sequences of allocated units. For each consecutive sequence, an extent entry 404 is added to the extent list with an ID 406 corresponding to the address of the first unit in the sequence, and a length 408 corresponding to the number of units in the sequence. Upon completing the evaluation of the extent list, the extent list can be written to the storage region 340, or a metadata area of storage 108, to replace the allocation bitmap 412.

Figure 6:
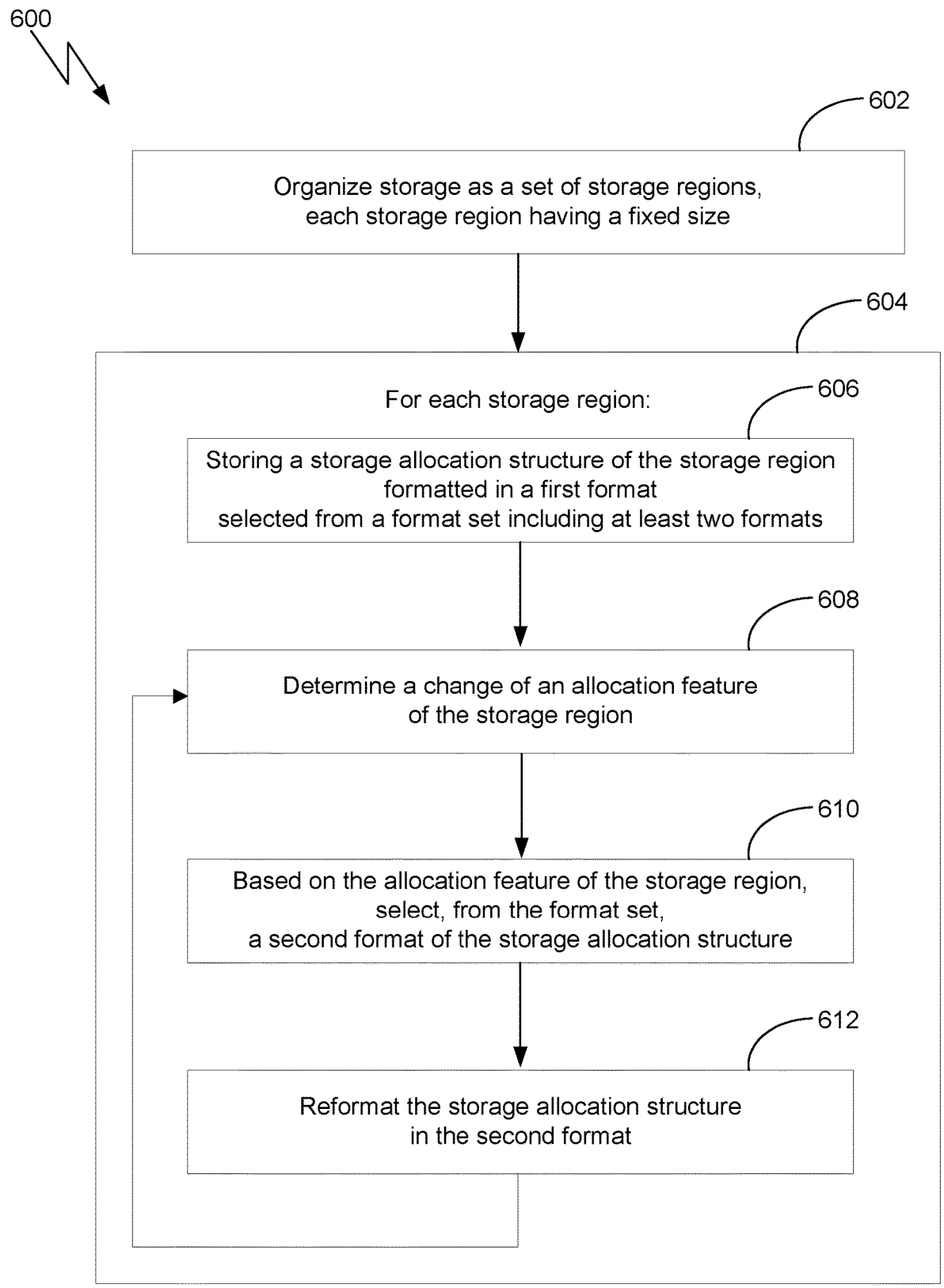
FIG. 6 illustrates a flow diagram of method steps for a method of managing allocation metadata for a storage device, according to various embodiments.

FIG. 6 illustrates a flow diagram of method steps for a method 600 of managing allocation metadata for a storage device, according to various embodiments. The method steps of FIG. 6 can be performed, e.g., to track storage allocation of the storage 108 of the computer system 100 of FIGS. 1 and 2, to format the allocator data structures 321, 322, 323 of FIG. 3, and/or to format the storage allocation structure 400 of FIG. 4.

As shown, a method 600 begins at 602 in which storage is organized as a set of storage regions, each storage region having a fixed size. In some examples, storage can be organized as a set of storage regions upon a computer system detecting a connection of a new storage device, or upon a request to initialize, partition, and/or format a storage device. In various embodiments, the fixed size can be based on a hardware device providing the storage or capabilities thereof; a partitioning format of the storage; a file system to be represented within the storage; one or more operating systems and/or applications that will access the storage; a selection by a user; or the like.

At step 604, a set of steps are performed for each storage region. In some examples, the steps are performed repeatedly, such as periodically, and/or upon detecting a change of an allocation feature.

At step 606, a storage allocation structure of the storage region is stored, which is formatted in a first format selected from a format set including at least two formats. In some examples, the at least two storage formats can include an extent list format and an allocation bitmap format, and the first format can be the extent list format.

At step 608, a change of an allocation feature of the storage region is determined. In some examples, the allocation feature can be a count of extents within the storage region when the storage allocation structure is formatted in the extent list format.

At step 610, based on the allocation feature of the storage feature, a second format of the storage allocation structure is selected from the format set. For example, if the count of extents within the storage region exceeds an extent count threshold, an allocation bitmap format can be selected. For example, if the count of extents in the storage region is less than or equal to the extent count threshold, an extent list format can be selected.

At step 612, the storage allocation structure is reformatted in the second format. For example, an extent list format can be converted to an allocation bitmap format, or an allocation bitmap format can be converted to an extent list format. For example, if the count of extents within the storage region exceeds an extent count threshold, the storage allocation structure is formatted as an allocation bitmap format. For example, if the count of extents in the storage region is less than or equal to the extent count threshold, the storage allocation structure can be reformatted in an extent list format. The method 600 returns to step 608 for further determination of changes to the allocation feature.

Figure 7:
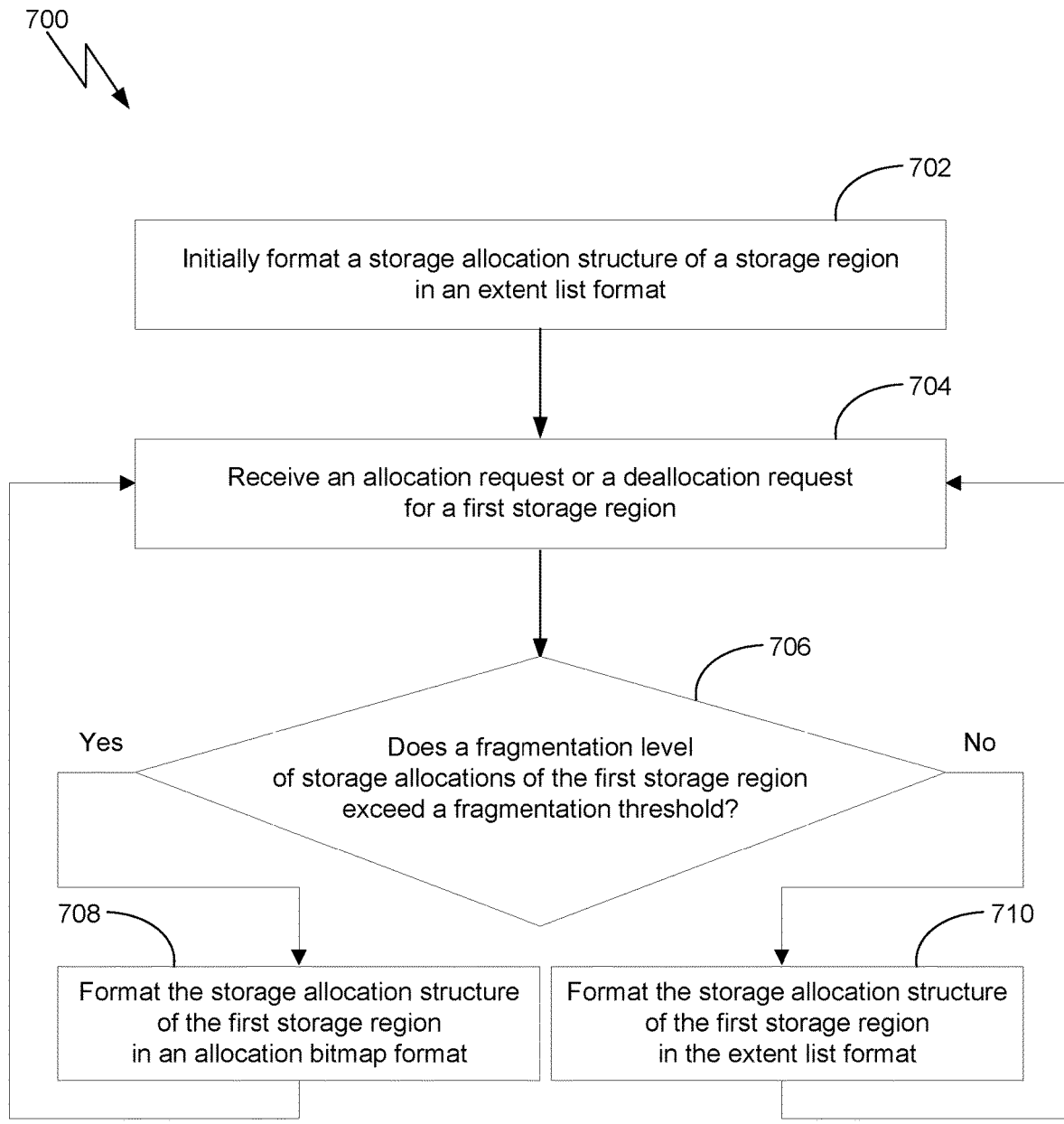
FIG. 7 illustrates a flow diagram of method steps for another method of managing allocation metadata for a storage device, according to various embodiments.

FIG. 7 illustrates a flow diagram of method steps for a method of managing allocation metadata for a storage device, according to various embodiments. The method steps of FIG. 7 can be performed, e.g., to track storage allocation of the storage 108 of the computer system 100 of FIGS. 1 and 2, to format the allocator data structures 321, 322, 323 of FIG. 3, to format the storage allocation structure 400 of FIG. 4 for a storage region 340, and/or to perform the organization of the storage region as shown at step 604 of FIG. 6.

As shown, a method 700 begins at 702 in which a storage allocation structure of a storage region is initially formatted in an extent list format. In some examples, the storage region can be initially unallocated, and an extent list format can include an extent count of zero extents.

At step 704, an allocation request or a deallocation request is received for a first storage region. In some examples, a device, operating system, or application can request an allocation of storage, an increase or decrease of previously allocated storage, or a deallocation of previously allocated storage. The first storage region can be any of the storage regions of a storage device, such as any fixed-size storage region as discussed in regard to FIG. 6.

At step 706, a determination is made as to whether a fragmentation level of storage allocations of the first storage region exceeds a fragmentation threshold. In some examples, a count of extents that are included in an extent list format of the storage allocation structure, or that would be included in the storage allocation structure if it were formatted in an extent list format, can be determined.

At step 708, based on determining at step 706 that the fragmentation level exceeds the fragmentation threshold, the storage allocation structure of the first storage region can be formatted in an allocation bitmap format. In some examples, if the storage allocation structure is currently in the extent list format, the storage allocation structure can be reformatted in the allocation bitmap format; and if the storage allocation structure is currently in the allocation bitmap format, the storage allocation structure can remain unchanged. The method 700 can return to step 704 to process further allocation requests or deallocation requests.

At step 710, based on determining at step 706 that the fragmentation level does not exceed the fragmentation threshold, the storage allocation structure of the first storage region can be formatted in an extent list format. In some examples, if the storage allocation structure is currently in the allocation bitmap format, the storage allocation structure can be reformatted in the extent list format; and if the storage allocation structure is currently in the extent list format, the storage allocation structure can remain unchanged. The method 700 can return to step 704 to process further allocation requests or deallocation requests.

Exemplary Virtualization System Architectures

Figure 8A:
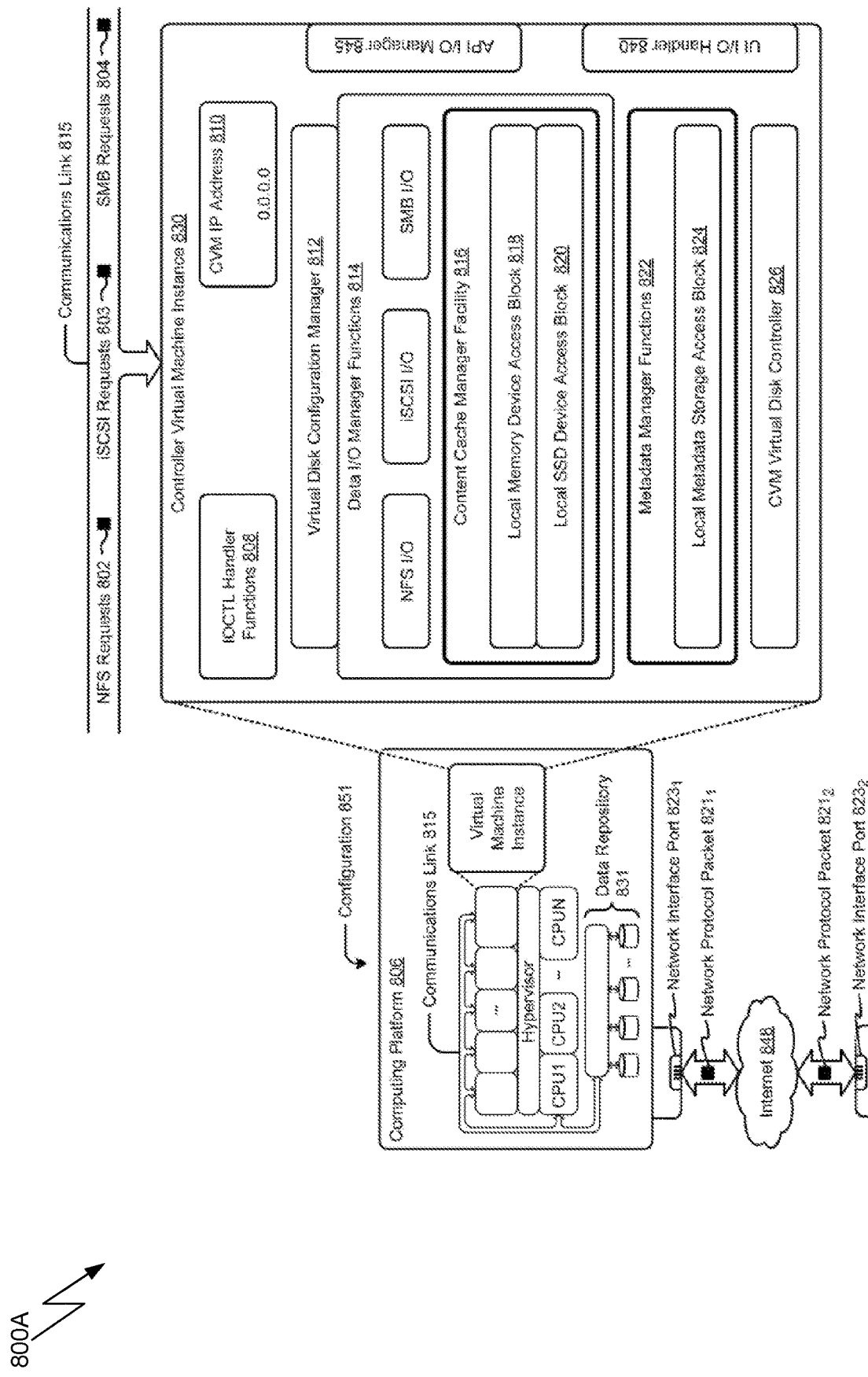
FIGS. 8A-8D are block diagrams illustrating virtualization system architectures configured to implement one or more aspects of the present embodiments.

FIG. 8A is a block diagram illustrating virtualization system architecture 800A configured to implement one or more aspects of the present embodiments. The virtualization system architectures 800A can include the computer system 100 of FIG. 1, including storage 108 that is organized by the storage allocation structure 400 of FIG. 4.

As shown in FIG. 8A, virtualization system architecture 800A includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines can include processing of storage I/O (input/output or IO) as received from any or every source within the computing platform. An example implementation of such a virtual machine that processes storage I/O is depicted as CVM instance 830.

In this and other configurations, a CVM instance receives block I/O storage requests as network file system (NFS) requests in the form of NFS requests 802, internet small computer storage interface (iSCSI) block IO requests in the form of iSCSI requests 803, Samba file system (SMB) requests in the form of SMB requests 804, and/or the like. The CVM instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry can be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 include one or more computer readable media that is capable of providing instructions to a data processor for execution. In some examples, each of the computer readable media can take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 830 includes content cache manager facility 816 that accesses storage locations, possibly including local dynamic random-access memory (DRAM) (e.g., through local memory device access block 818) and/or possibly including accesses to local solid-state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and can comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance can perform respective portions of sequences of instructions as can be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 can transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions can be processed and/or executed by a CPU as it is received and/or program instructions can be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
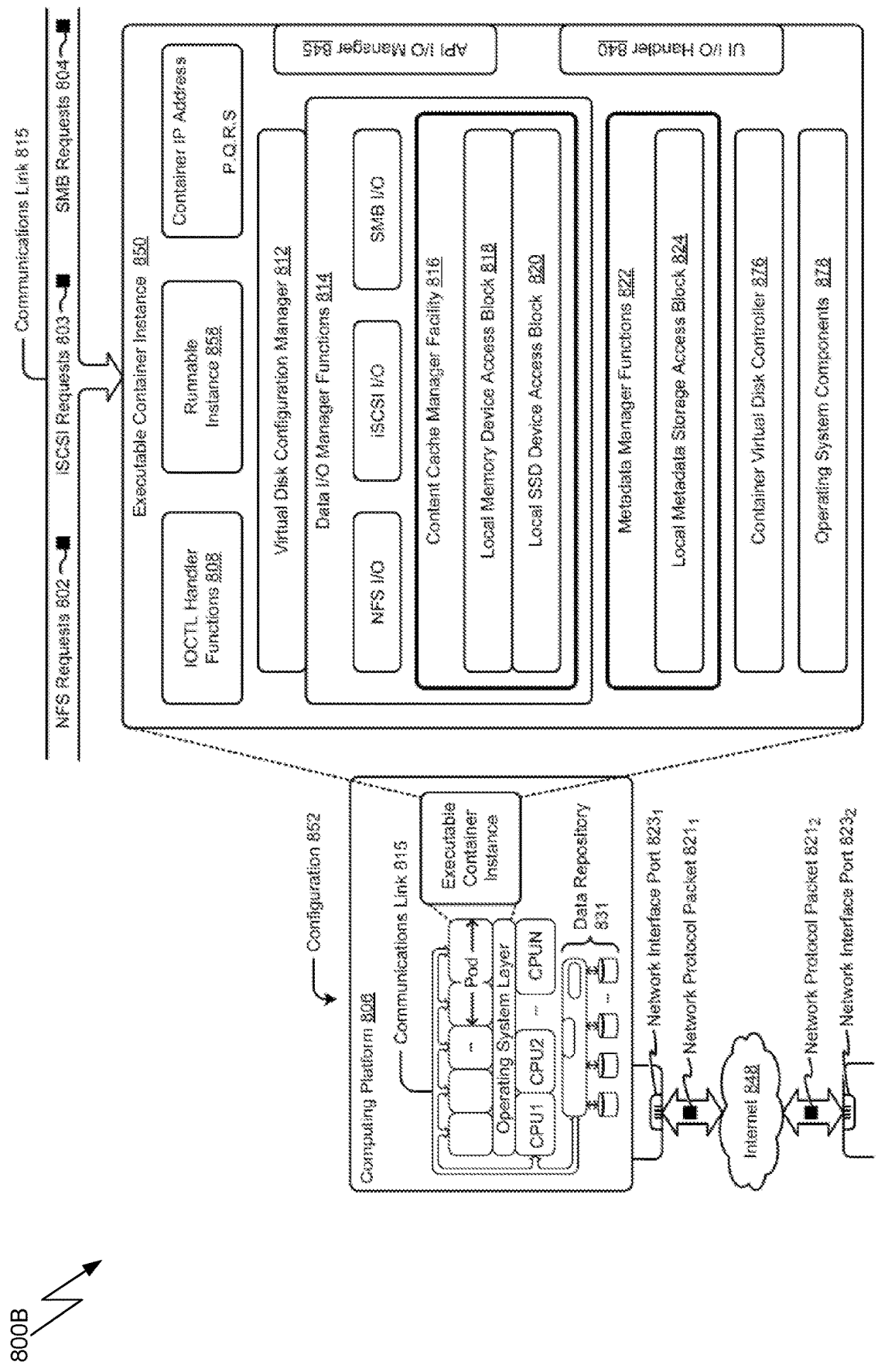

FIG. 8B depicts a block diagram illustrating another virtualization system architecture 800B configured to implement one or more aspects of the present embodiments. As shown in FIG. 8B, virtualization system architecture 800B includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node can communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and can include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
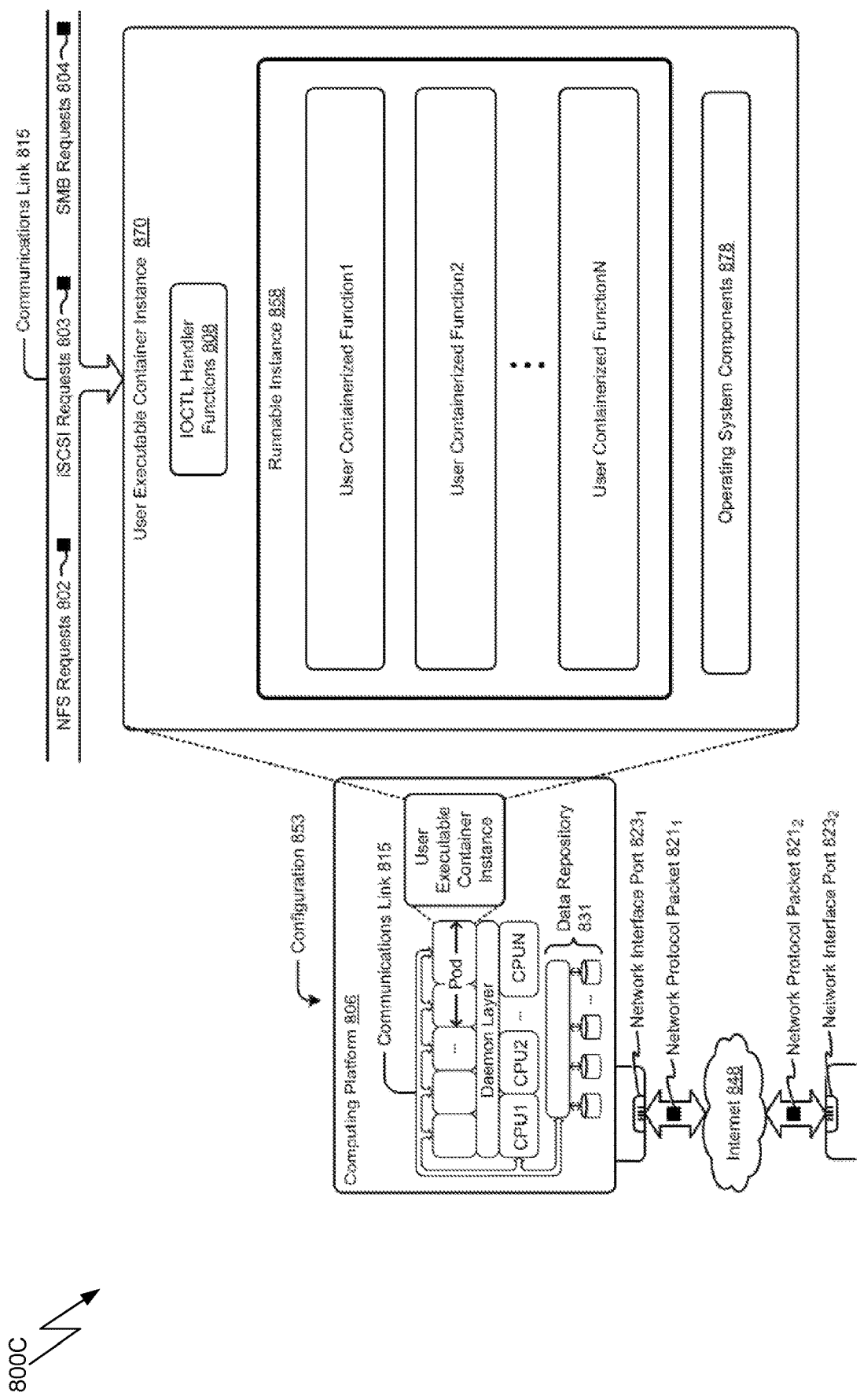

FIG. 8C is a block diagram illustrating virtualization system architecture 800C configured to implement one or more aspects of the present embodiments. As shown in FIG. 8C, virtualization system architecture 800D includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 800A, 800B, and/or 800C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage can include storage that is accessible over communications link 815. Such network accessible storage can include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8D:
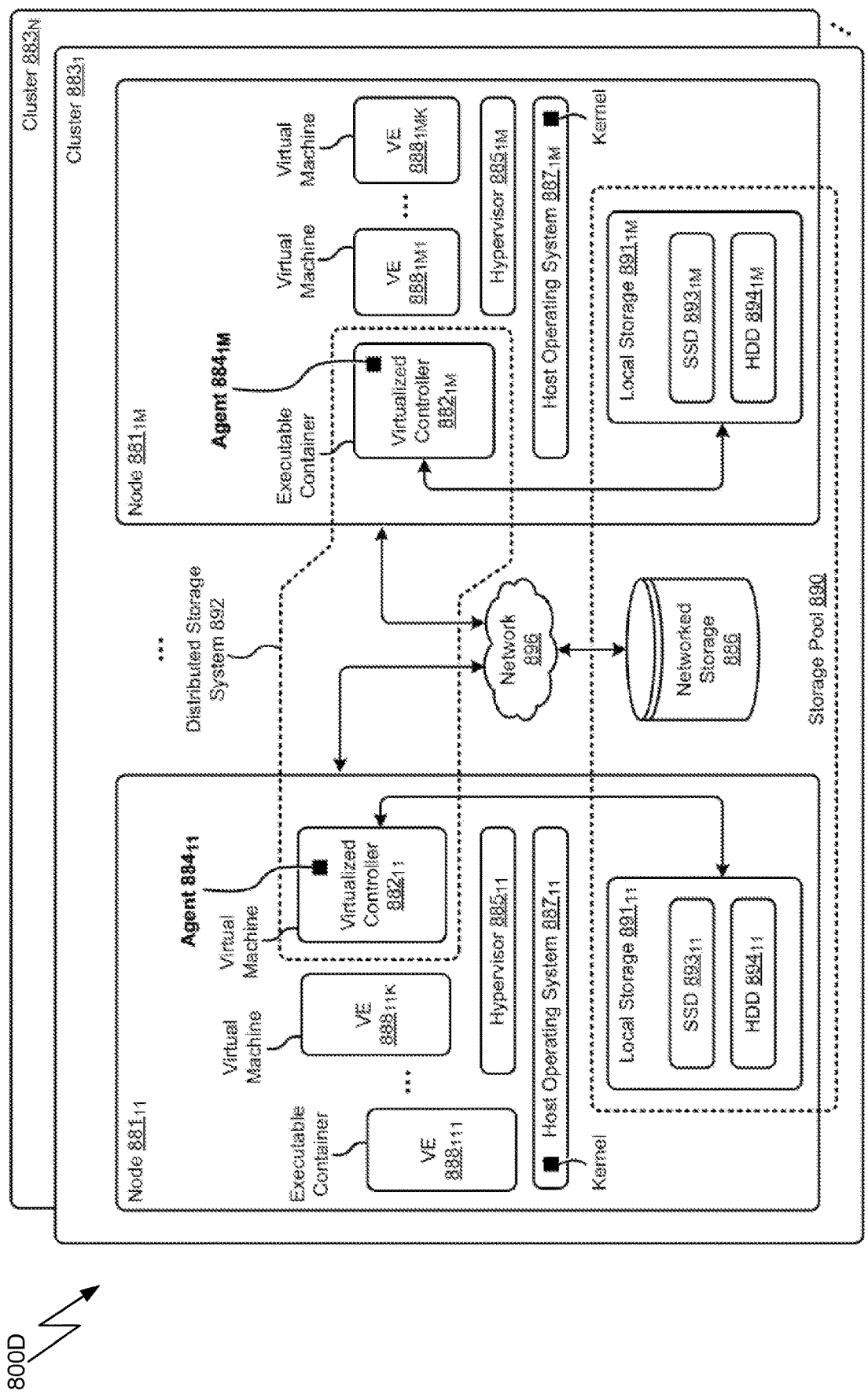

FIG. 8D is a block diagram illustrating virtualization system architecture 800D configured to implement one or more aspects of the present embodiments. As shown in FIG. 8D, virtualization system architecture 800D includes a distributed virtualization system that includes multiple clusters (e.g., cluster 8831, . . . , cluster 883N) comprising multiple nodes that have multiple tiers of storage in a storage pool. Representative nodes (e.g., node 88111, . . . , node 8811M) and a storage pool associated with cluster 8831 are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage 82111, . . . , local storage 8211M). For example, the local storage can be within or directly attached to a server and/or appliance associated with the nodes. Such local storage can include solid state drives (SSD 89311, . . . , SSD 8931M), hard disk drives (HDD 89411, . . . , HDD 8941M), and/or other storage devices.

As shown, any of the nodes of the distributed virtualization system can implement one or more user virtualized entities (e.g., VE 888111, . . . , VE 88811K, . . . , VE 8881M1, . . . , VE 8881MK), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system 88711, . . . , host operating system 8871M), while the VMs run multiple applications on various respective guest operating systems. Such flexibility can be facilitated at least in part by a hypervisor (e.g., hypervisor 88511, . . . , hypervisor 8851M), which hypervisor is logically located between the various guest operating systems of the VMs and the host operating system of the physical infrastructure (e.g., node).

As an alternative, executable containers can be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system 88711, . . . , host operating system 8871M) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to the storage pool by the VMs and/or the executable containers.

Multiple instances of such virtualized controllers can coordinate within a cluster to form the distributed storage system 892 which can, among other operations, manage the storage pool. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node 88111 can interface with a controller virtual machine (e.g., virtualized controller 88211) through hypervisor 88511 to access data of the storage pool. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller 8821M) in an operating system virtualization environment at a given node. In this case, for example, the virtualized entities at node 8811M can access the storage pool by interfacing with a controller container (e.g., virtualized controller 8821M) through hypervisor 8851M and/or the kernel of host operating system 8871M.

In some embodiments, one or more instances of an agent can be implemented in the distributed storage system 892 to facilitate the herein disclosed techniques. Specifically, agent 88411 can be implemented in the virtualized controller 88211, and agent 8841M can be implemented in the virtualized controller 8821M. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

In sum, techniques are disclosed for dynamically formatting a storage allocation structure, such as an allocator page. A storage allocation structure can initially be formatted as an extent list, and can remain in the extent list format while storage fragmentation is low and an extent list of the free IDs is short. When storage fragmentation is high and an extent list of the free IDs in the storage region would be long, the storage allocation structure can be reformatted as a bitmap, which is more compact and efficient. That is, a dynamic format of a storage allocation record can switch dynamically between an extent list format and a bitmap format based on an allocation feature, such as (e.g.) a number of extents that would be present if the extent-based format were used.

At least one technical advantage of the disclosed techniques relative to the prior art is that, with the disclosed techniques, a storage system can compactly record storage allocation information even when there is a high level of variability in how the storage regions of a storage device are allocated. As a result, the dynamic format of the storage allocation record provides the advantages of multiple formats while avoiding the disadvantages of those formats. By reformatting the storage allocation record to suit different circumstances, the storage system can exhibit and maintain high performance in creating, accessing, and updating storage allocations in a wide range of circumstances, such as when storage fragmentation is high or low, in accordance with some embodiments. These technical advantages provide one or more technological improvements over prior art approaches.

1. In some embodiments, one or more non-transitory computer-readable media store program instructions that, when executed by one or more processors, cause the one or more processors to perform steps of organizing storage as a set of storage regions, each storage region having a fixed size, and for each storage region, storing a storage allocation structure of the storage region formatted in a first format selected from a format set including at least two formats, determining a change of an allocation feature of the storage region, based on the allocation feature of the storage region, selecting, from the format set, a second format of the storage allocation structure, and reformatting the storage allocation structure in the second format.

2. The one or more non-transitory computer-readable media of clause 1, wherein the allocation feature includes a fragmentation level of storage allocations of the storage region.

3. The one or more non-transitory computer-readable media of clauses 1 or 2, wherein the storage allocation structure for each storage region is initially formatted in an extent list format.

4. The one or more non-transitory computer-readable media of any of clauses 1-3, wherein the reformatting includes, based on a decrease of a fragmentation level of storage allocations of the storage region while the storage allocation structure is in an allocation bitmap format, reformatting the storage allocation structure in an extent list format.

5. The one or more non-transitory computer-readable media of any of clauses 1-4, wherein the reformatting includes, based on an increase of a fragmentation level of storage allocations of the storage region while the storage allocation structure is in an extent list format, reformatting the storage allocation structure in an allocation bitmap format.

6. The one or more non-transitory computer-readable media of any of clauses 1-5, wherein the allocation feature includes an extent count.

7. The one or more non-transitory computer-readable media of any of clauses 1-6, wherein selecting the second format includes comparing an extent count of the storage allocation structure with an extent count threshold.

8. The one or more non-transitory computer-readable media of any of clauses 1-7, wherein the storage allocation structure is formatted in an extent list format based on a storage size of an extent count and an extent list being within a cache line size of the one or more processors.

9. The one or more non-transitory computer-readable media of any of clauses 1-8, wherein the storage allocation structure is formatted in an allocation bitmap format based on a storage size of an extent count and an extent list exceeding a cache line size of the one or more processors.

10. In some embodiments, a method comprises organizing storage as a set of storage regions, each storage region having a fixed size; and for each storage region, storing a storage allocation structure of the storage region formatted in a first format selected from a format set including at least two formats, determining a change of an allocation feature of the storage region, based on the allocation feature of the, storage region, selecting, from the format set, a second format of the storage allocation structure, and reformatting the storage allocation structure in the second format.

11. The method of clause 10, wherein the allocation feature includes a fragmentation level of storage allocations of the storage region.

12. The method of clauses 10 or 11, wherein the storage allocation structure for each storage region is initially formatted in an extent list format.

13. The method of any of clauses 10-12, wherein the reformatting includes, based on a decrease of a fragmentation level of storage allocations of the storage region while the storage allocation structure is in an allocation bitmap format, reformatting the storage allocation structure in an extent list format.

14. The method of any of clauses 10-13, wherein the reformatting includes, based on an increase of a fragmentation level of storage allocations of the storage region while the storage allocation structure is in an extent list format, reformatting the storage allocation structure in an allocation bitmap format.

15. The method of any of clauses 10-14, wherein the allocation feature includes an extent count.

16. The method of any of clauses 10-15, wherein selecting the second format includes comparing an extent count of the storage allocation structure with an extent count threshold.

17. The method of any of clauses 10-16, wherein the storage allocation structure is formatted in an extent list format based on a storage size of an extent count and an extent list being within a cache line size of the one or more processors.

18. The method of any of clauses 10-17, wherein the storage allocation structure is formatted in an allocation bitmap format based on a storage size of an extent count and an extent list exceeding a cache line size of the one or more processors.

19. In some embodiments, a system for organizing storage comprises a memory storing instructions, and one or more processors that execute the instructions to perform steps comprising organizing storage as a set of storage regions, each storage region having a fixed size, and for each storage region, storing a storage allocation structure of the storage region formatted in a first format selected from a format set including at least two formats, determining a change of an allocation feature of the storage region, based on the allocation feature of the storage region, selecting, from the format set, a second format of the storage allocation structure, and reformatting the storage allocation structure in the second format.

20. The system of clause 19, wherein the allocation feature includes a fragmentation level of storage allocations of the storage region.

21. The system of clauses 19 or 20, wherein the storage allocation structure for each storage region is initially formatted in an extent list format.

22. The system of any of clauses 19-21, wherein the reformatting includes, based on a decrease of a fragmentation level of storage allocations of the storage region while the storage allocation structure is in an allocation bitmap format, reformatting the storage allocation structure in an extent list format.

23. The system of any of clauses 19-22, wherein the reformatting includes, based on an increase of a fragmentation level of storage allocations of the storage region while the storage allocation structure is in an extent list format, reformatting the storage allocation structure in an allocation bitmap format.

24. The system of any of clauses 19-23, wherein the allocation feature includes an extent count.

25. The system of any of clauses 19-24, wherein selecting the second format includes comparing an extent count of the storage allocation structure with an extent count threshold.

26. The system of any of clauses 19-25, wherein the storage allocation structure is formatted in an extent list format based on a storage size of an extent count and an extent list being within a cache line size of the one or more processors.

27. The system of any of clauses 19-26, wherein the storage allocation structure is formatted in an allocation bitmap format based on a storage size of an extent count and an extent list exceeding a cache line size of the one or more processors.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method, or computer program product. Accordingly, aspects of the present disclosure can take the form of an entirely hardware embodiment, an entirely software embodiment (including firmware, resident software, microcode, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function (s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:
    organizing storage as a set of storage regions, each storage region having a fixed size; and
    for each storage region,
        storing a storage allocation structure of the storage region formatted in a first format selected from a format set including at least two formats;
        determining a change in a fragmentation level of storage allocations of the storage region;
        based on the fragmentation level of storage allocations of the storage region, selecting, from the format set, a second format of the storage allocation structure; and
        reformatting the storage allocation structure in the second format.

2. The one or more non-transitory computer-readable media of claim 1, wherein the storage allocation structure for each storage region is initially formatted in an extent list format.

3. The one or more non-transitory computer-readable media of claim 1, wherein the reformatting includes, based on a decrease of the fragmentation level of storage allocations of the storage region while the storage allocation structure is in an allocation bitmap format, reformatting the storage allocation structure in an extent list format.

4. The one or more non-transitory computer-readable media of claim 1, wherein the reformatting includes, based on an increase of the fragmentation level of storage allocations of the storage region while the storage allocation structure is in an extent list format, reformatting the storage allocation structure in an allocation bitmap format.

5. The one or more non-transitory computer-readable media of claim 1, wherein the fragmentation level corresponds to an extent count.

6. The one or more non-transitory computer-readable media of claim 1, wherein selecting the second format includes comparing an extent count of the storage allocation structure with an extent count threshold.

7. The one or more non-transitory computer-readable media of claim 1, wherein the storage allocation structure is formatted in an extent list format based on a storage size of an extent count and an extent list being within a cache line size of the one or more processors.

8. The one or more non-transitory computer-readable media of claim 1, wherein the storage allocation structure is formatted in an allocation bitmap format based on a storage size of an extent count and an extent list exceeding a cache line size of the one or more processors.

9. A method comprising:
    organizing storage as a set of storage regions, each storage region having a fixed size; and
    for each storage region,
        storing a storage allocation structure of the storage region formatted in a first format selected from a format set including at least two formats;
        determining a change in a fragmentation level of storage allocations of the storage region;
        based on the fragmentation level of storage allocations of the storage region, selecting, from the format set, a second format of the storage allocation structure; and
        reformatting the storage allocation structure in the second format.

10. The method of claim 9, wherein the storage allocation structure for each storage region is initially formatted in an extent list format.

11. The method of claim 9, wherein the reformatting includes, based on a decrease of the fragmentation level of storage allocations of the storage region while the storage allocation structure is in an allocation bitmap format, reformatting the storage allocation structure in an extent list format.

12. The method of claim 9, wherein the reformatting includes, based on an increase of the fragmentation level of storage allocations of the storage region while the storage allocation structure is in an extent list format, reformatting the storage allocation structure in an allocation bitmap format.

13. The method of claim 9, wherein the fragmentation level corresponds to an extent count.

14. The method of claim 9, wherein selecting the second format includes comparing an extent count of the storage allocation structure with an extent count threshold.

15. The method of claim 9, wherein the storage allocation structure is formatted in an extent list format based on a storage size of an extent count and an extent list being within a cache line size of the one or more processors.

16. The method of claim 9, wherein the storage allocation structure is formatted in an allocation bitmap format based on a storage size of an extent count and an extent list exceeding a cache line size of the one or more processors.

17. A system for organizing storage, comprising:
    a memory storing instructions, and
    one or more processors that execute the instructions to perform steps comprising:
        organizing storage as a set of storage regions, each storage region having a fixed size; and
        for each storage region, storing a storage allocation structure of the storage region formatted in a first format selected from a format set including at least two formats;

determining a change in a fragmentation level of storage allocations of the storage region;

based on the fragmentation level of storage allocations of the storage region, selecting, from the format set, a second format of the storage allocation structure; and reformatting the storage allocation structure in the second format.

18. The system of claim 17, wherein the storage allocation structure for each storage region is initially formatted in an extent list format.

19. The system of claim 17, wherein the reformatting includes, based on a decrease of the fragmentation level of storage allocations of the storage region while the storage allocation structure is in an allocation bitmap format, reformatting the storage allocation structure in an extent list format.

20. The system of claim 17, wherein the reformatting includes, based on an increase of the fragmentation level of storage allocations of the storage region while the storage allocation structure is in an extent list format, reformatting the storage allocation structure in an allocation bitmap format.

21. The system of claim 17, wherein the fragmentation level corresponds an extent count.

22. The system of claim 17, wherein selecting the second format includes comparing an extent count of the storage allocation structure with an extent count threshold.

23. The system of claim 17, wherein the storage allocation structure is formatted in an extent list format based on a storage size of an extent count and an extent list being within a cache line size of the one or more processors.

24. The system of claim 17, wherein the storage allocation structure is formatted in an allocation bitmap format based on a storage size of an extent count and an extent list exceeding a cache line size of the one or more processors.

* * * * *